United States Patent

[11] 3,597,066

[72] Inventor Theo Wilharm
 Endersbach, Germany
[21] Appl. No. 657,906
[22] Filed Aug. 2, 1967
[45] Patented Aug. 3, 1971
[73] Assignee Robert Bosch Photokino GmbH
 Stuttgart-Untertuerkheim, Germany
[32] Priority Aug. 27, 1966
[33] Germany
[31] B88,666

[54] MOTION PICTURE CAMERA
 15 Claims, 8 Drawing Figs.
[52] U.S. Cl. ................................................ 352/141,
 352/208
[51] Int. Cl. .................................................. G03b 19/18
[50] Field of Search........................................... 95/10 C,
 64; 352/141, 208—209, 210

[56] References Cited
UNITED STATES PATENTS
3,208,078 9/1965 Koeber.................. 352/141

FOREIGN PATENTS
243,088 10/1955 Austria.................... 352/141
41,467 9/1965 Germany.................. 352/141

OTHER REFERENCES
Schafer, German Printed Application No. 1,221,097, July 14, 1966, (KL57a-43), 352/141

Primary Examiner—Samuel S. Matthews
Assistant Examiner—Joseph F. Peters, Jr.
Attorney—Michael S. Striker ABSTRACT: The shutter of a motion picture camera has a surface which reflects light against a photosensitive element when the shutter covers the film aperture. That portion of such surface which covers the aperture when the shutter is at rest reflects part of the light onto the photosensitive element and the remainder of the light in another direction. In this way, the amount of light received by the photosensitive element when the shutter is at rest is the same as the average amount of light reaching the photosensitive element when the shutter is in motion. The shutter may be of the rotary or reciprocatory type and its light-reflecting surface may be formed by a foil or by a coat of suitable reflecting material.

INVENTOR:
THEO WILHARM

BY
Michael J. Striker
his ATTORNEY

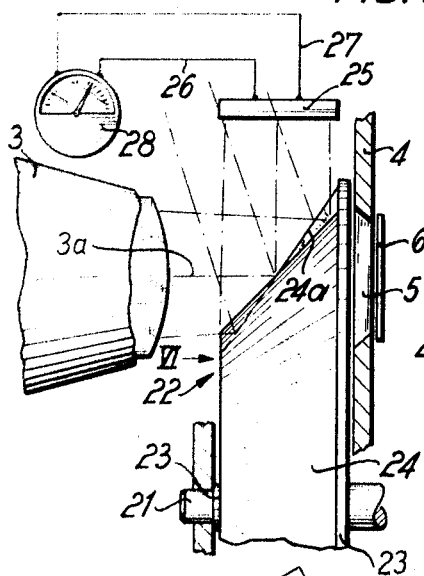
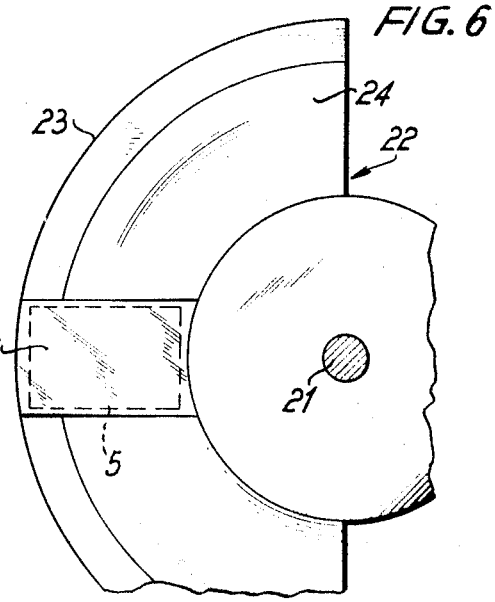
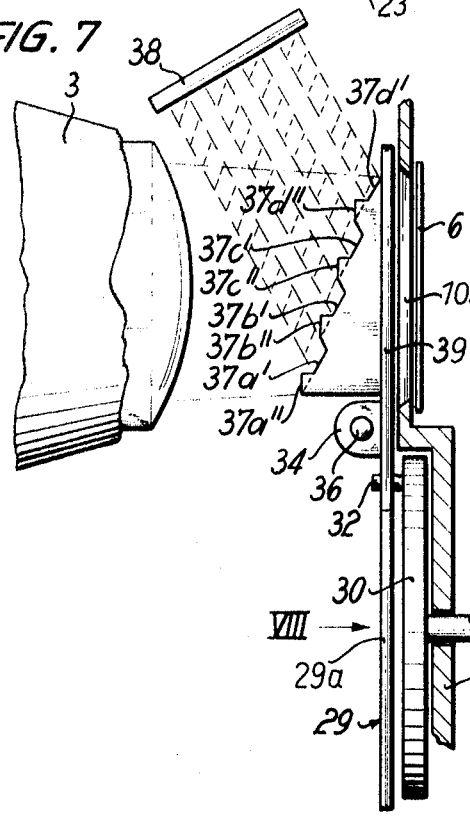
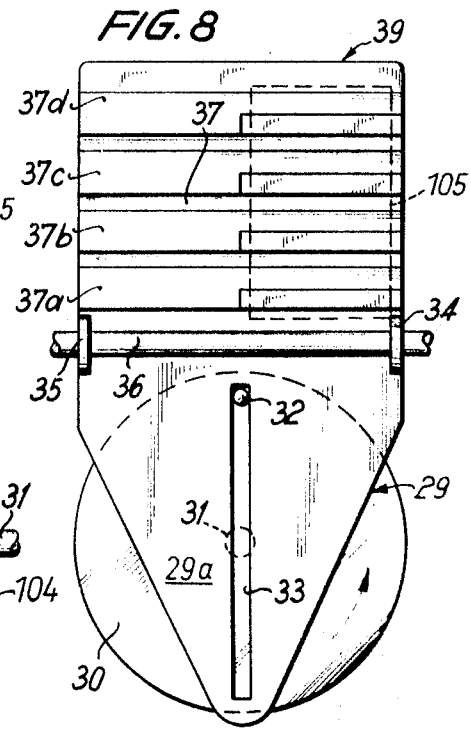
INVENTOR:
THEO WILHARM
BY
his ATTORNEY

MOTION PICTURE CAMERA

BACKGROUND OF THE INVENTION

The present invention relates to motion picture cameras in general, and more particularly to improvements in motion picture cameras wherein a shutter moves cyclically between the objective and the film aperture to admit light to the film when the latter is stationary and to cover the aperture when the film is being advanced by the length of a frame. Still more particularly, the invention relates to improvements in motion picture cameras wherein the shutter reflects light onto a photosensitive element which is connected in circuit with a moving coil instrument serving to indicate the intensity of scene light and/or to control an automatic diaphragm.

In motion picture cameras of the just outlined character, the photosensitive element receives light when the shutter is idle as well as when the shutter performs cyclic movements so that the moving coil instrument can indicate the intensity of scene light. This enables the operator to determine the intensity at all times, and the moving coil instrument can automatically change the size of the diaphragm opening when the camera is in use. However, when the shutter is in motion, the amount of light which reaches the photosensitive element fluctuates but such fluctuations do not affect the position of the needle in the moving coil instrument because the latter's inertia prevents it from changing the position of the needle at the same frequency at which the shutter performs its cyclic movement. As a rule, the setting of a diaphragm which is controlled by the moving coil instrument is lower when the shutter moves than when the shutter is in the position of rest despite the fact that the intensity of scene light remains unchanged.

In order to compensate for such differences in the amounts of light which reach the photosensitive element when the latter respectively receives reflected light from a stationary or a moving shutter, certain motion picture cameras are provided with a resistor which is connected in the circuit of the moving coil instrument when the shutter actuating trigger is released (see German Pat. No. 1,067,303). Such arrangement is overly sensitive and complicated because its reliability depends on the design of the switch which controls the resistor and on the effect of temperature upon the resistor. It was found that the moving coil instruments of such cameras become unreliable after extended periods of use and when the operating conditions deviate from normal.

In accordance with another prior proposal (German Pat. No. 1,094,585), the reflectivity of a portion of the surface on the shutter is lessened by the application of a light-absorbing coat which is in registry with the objective when the shutter is idle. The composition, application and characteristics of such light-absorbent coats must be selected with a very high degree of accuracy, and the coats must be applied by resorting to complicated machinery and by employing highly skilled persons. Furthermore, it is very difficult to mass-produce such shutters without any changes in the light-reflecting and light-absorbent characteristics of their surfaces.

U.S. Pat. No. 3,248,166 to Reinsch proposes the utilization of an opaque mask which is moved into the light path when the shutter is idle to reduce the amount of light so that the average amount of light reaching the photosensitive element in the exposure control is the same regardless of the condition of the shutter. The mask is connected with the shutter release and is automatically withdrawn from the light path when the shutter is set in motion. This solution is satisfactory but the mask occupies additional room and must be mechanically or otherwise coupled to the shutter release.

SUMMARY OF THE INVENTION

It is an object of my invention to provide a novel and improved motion picture camera wherein the shutter can direct to the photosensitive element requisite amounts of light irrespective of whether the shutter is in motion or in the position of rest and wherein such distribution of light can be carried out without necessitating the provision of any additional parts, such as resistors, masks, opaque coatings or the like.

Another object of the invention is to provide a motion picture camera of the just outlined type wherein the shutter can be mass-produced at low cost and in such a way that each of a large number of serially produced shutters will exhibit identical light-reflecting characteristics.

A further object of the invention is to provide a novel blade which can be used as a part of a rotary or reciprocatory shutter for motion picture cameras.

An additional object of the instant invention is to provide a motion picture camera wherein the shutter occupies the same amount of space or even less than in presently known motion picture cameras.

A concomitant object of my invention is to provide a light measuring structure for motion picture cameras which is capable of measuring the light passing through the objective of the camera in such a way that proper compensation will be made for the fact that the aperture is cyclically covered and uncovered by the shutter.

An ancillary object of the invention is to provide a motion picture camera which can measure light passing through the objective when the shutter is at rest in such a way that the measurement will correspond with requisite accuracy to the measurement when the camera is in operation.

My invention is embodied in a motion picture camera which comprises an objective, means defining a light-admitting aperture behind the optical axis of the objective, a photosensitive element which may constitute a resistor or a cell, and novel shutter means moving cyclically between the objective and the aperture for covering and uncovering the aperture during each cycle so that the film is exposed only when the aperture is uncovered. The shutter means has a position of rest when the aperture is covered and is provided with a light-reflecting surface which reflects light received from the objective when the aperture is covered. The light-reflecting surface has a first portion which reflects light onto the photosensitive element when the shutter means is in motion but still covers the aperture and a second portion which, when the shutter means is in the position of rest, reflects a first amount of light onto the photosensitive element and reflects a second amount of light in a direction other than toward the photosensitive element.

Each portion of the light-reflecting surface may be composed of several strip- or band-shaped sections whereby all such sections of the first portion reflect light onto the photosensitive element whereas only some of the sections in the second portion reflect light onto such photosensitive element.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 5 is a fragmentary longitudinal vertical sectional view of a second motion picture camera with a modified rotary shutter;

FIG. 6 is a fragmentary front elevational view of the modified shutter substantially as seen in the direction of the arrow VI in FIG. 5;

FIG. 7 is a fragmentary longitudinal vertical sectional view of a third motion picture camera with a reciprocatory shutter; and FIG. 8 is a front elevational view of the shutter substantially as seen in the direction of the arrow VIII of FIG. 7.

DESCRIPTION OF THE PREFERRED EMBODIMENTS

Figure 1:
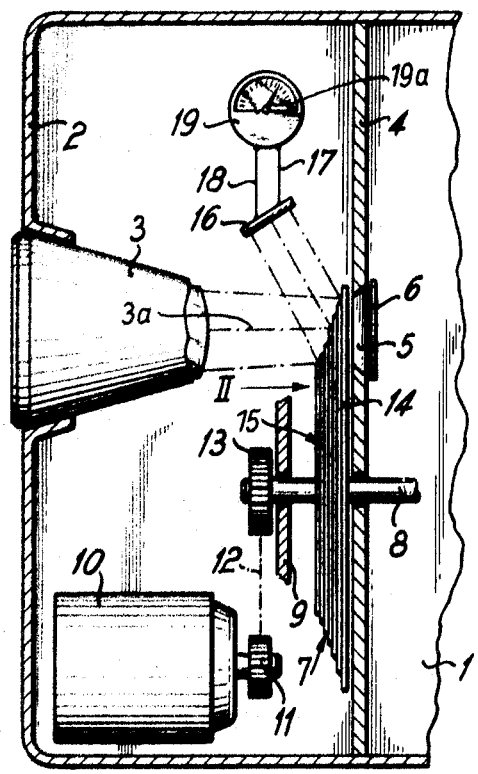
FIG. 1 is a fragmentary longitudinal vertical sectional view of a motion picture camera with a rotary shutter which embodies one form of my invention.

Referring first to FIG. 1, there is shown a portion of a motion picture camera comprising a housing or body 1 whose front wall 2 carries an objective 3. An internal partition or wall 4 of the housing 1 is provided with a window or aperture 5 which is located behind the optical axis of the objective 3 and admits light to the motion picture film 6. The film is advanced stepwise in a manner well known from the art of motion picture cameras. The pulldown which effects such stepwise movements of the film 6 is not shown in the drawings.

A rotary shutter 7 is installed in the space between the walls 2 and 4. This shutter comprises a hub 7a (see FIG. 2) and a blade 14 which extends along an arc of 180°. The function of the shutter 7 is to intermittently interrupt the passage of light from the objective 3 to the film 6, always at the time when the film is being advanced by the length of a frame. The hub 7a is rigid with a shaft 8 which is journaled in the partition 4 and in a further intermediate wall 9 of the housing 1. This shaft 8 forms part of a drive which further includes an electric motor 10 and a transmission including a first pinion 11 on the output shaft of the motor 10, a second pinion 13 on the shaft 8, and an endless toothed belt 12 or the like which is trained around the pinions 11 and 13.

Figure 3:
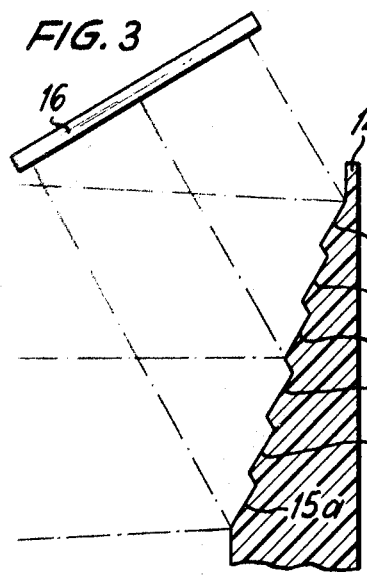
FIG. 3 is an enlarged fragmentary sectional view of the shutter substantially as seen in the direction of arrows from the line III–III of FIG. 2.

The front side of the blade 14 (i.e., that side which faces the objective 3) is mirrored, for example, by the provision of a thin metallic foil or another coat of light-reflecting material. When the shutter 7 is in a position of rest (shown in FIG. 2), a portion 20 of the light-reflecting surface 15 on its blade 14 is located between the objective 3 and the aperture 5. The purpose of the light-reflecting surface 15 is to direct controlled amounts of light against a photosensitive element 16 which is installed in the space between the walls 2 and 4 and is electrically connected with the moving coil instrument 19 of an automatic exposure meter by means of conductors 17, 18. The instrument 19 may be used to merely indicate the intensity of scene light or to control an automatic diaphragm in a manner well known from the art of motion picture cameras. The light-reflecting surface 15 of the blade 14 includes the aforementioned portion 20 and a two-part portion 15A which includes a series of elongated arcuate sections 15a—15f shown in FIG. 3. The sections 15a—15f are inclined with reference to the optical axis 3a of the objective 3 and are stepped as seen in the radial direction of the shutter 7. The inclination of all of the sections 15a—15f is the same. Fig. 3 shows that these sections reflect light coming from the objective 3 against the light-sensitive surface of the photosensitive element 16 when the shutter 7 rotates and is in a position other than that in which the blade 14 permits light to reach the aperture 5 and film 6. In the illustrated embodiment, the element 16 is a photoelectric cell and the output member or needle 19a of the moving coil instrument 19 indicates the strength of the photocurrent.

Figure 4:
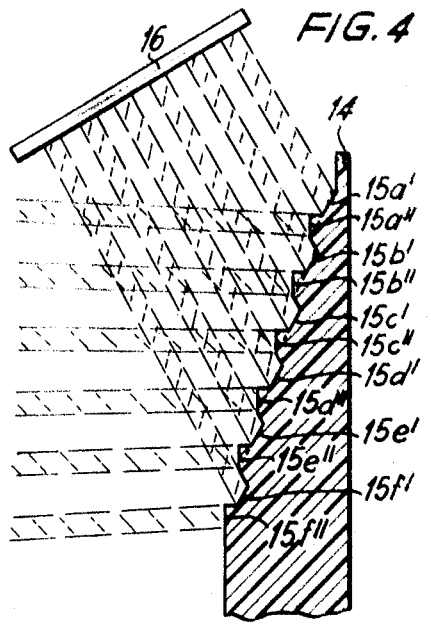
FIG. 4 is a similar fragmentary sectional view of the shutter substantially as seen in the direction of arrows from the line IV–IV of FIG. 2.
Figure 2:
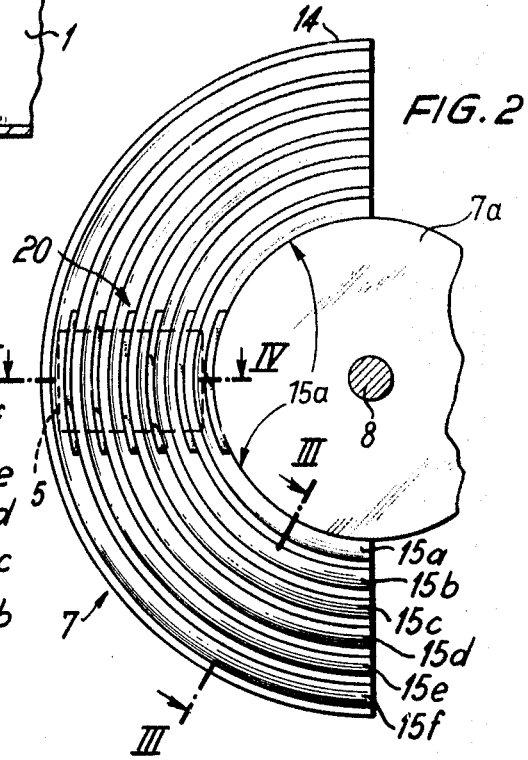
FIG. 2 is a larger scale front elevational view of the shutter as seen in the direction of the arrow II in FIG. 1.

The portion 20 of the reflecting surface 15 comprises alternating elongated arcuate light-reflecting sections 15a'—15f' and 15a''—15f'', see FIG. 4. When the shutter 7 is in the position of rest (FIG. 2), the sections 15a'—15f' reflect a certain amount of light onto the photosensitive element 16 but the inclination of sections 15a''—15f'' is such that they reflect the remaining light in a direction other than against the element 16. The inclination of sections 15a'—15f' with reference to the optical axis 3a is the same as that of the sections 15a—15f. The inclination of the sections 15a''—15f'' is such that they reflect light back toward the objective 3. The combined width of one of the sections 15a'—15f' and the associated section 15a''—15f'' (as considered in the radial direction of the blade 14) is the same as the width of the respective section 15a—15f. This is shown in FIG. 2. The planes of the sections 15a''—15f'' are normal or nearly normal to the optical axis 3a. Thus, when the shutter 7 is in the position of rest, the photosensitive element 16 receives only that amount of light which is reflected on the sections 15a'—15f', i.e., less light than when the blade 14 maintains the portion 15A of its surface 15 between the aperture 5 and objective 3. Light reflected by the sections 15a'—15f' forms on the light-sensitive surface of the element 16 a regular pattern of illuminated strips which alternate with darker strips caused by the sections 15a''13 15f''. The ratio of the combined area of sections 15a'—15f' to the combined area of sections 15a''—15f'' is such that, when the shutter 7 is in the position of rest, the element 16 receives the same amount of light as the average amount of light reflected by the sections 15a—15f and 15a'—15f' when the shutter rotates. In other words, the strength of the photocurrent generated by element 16 is the same, regardless of whether the shutter rotates or assumes the position of rest.

FIGS. 5 and 6 illustrate a portion of a second motion picture camera including a rotary shutter 22 which is mounted on a drive shaft 21. The blade 23 of the shutter 22 resembles a portion of a smooth surfaced conical frustum. That surface 24 of the blade 23 which faces the objective 3 reflects light and is preferably formed by the exposed surface of a metallic foil or another coat of suitable reflecting material which can be sprayed or otherwise applied to the blade 23. The inclination of the surface 24 is such that it can reflect light onto a photosensitive element 25 which is connected with a moving coil instrument 28 by means of conductors 26, 27. The blade 23 can rotate in a plane which is located between the objective 3 and the aperture 5, the latter being provided in the wall 4 in front of the motion picture film 6.

That portion 24a of the surface 24 which is located between the objective 3 and the aperture 5 when the shutter 22 is in the position of rest (shown in FIG. 6) is inclined with reference to the optical axis 3a in such a way that it reflects only half of the total amount of incoming light against the light-sensitive surface of the element 25. This is shown in FIG. 5 by phantom lines. The remaining portion of the surface 24 (which is located between the objective 3 and the aperture 5 when the shutter 22 rotates and is not in the position of rest or in the position in which light can reach the film 6) is inclined with reference to the optical axis 3a in such a way that it directs onto the element 25 more light than the surface portion 24a. For example, the remaining portion of the surface 24 can reflect all of the incoming light against the element 25. The portion 24a performs the same function as the sections 15a'—15f' and 15a''—15f'' of the surface portion 20 in the embodiment of FIGS. 1 to 4. When the shutter 22 is in the position of rest, the element 25 receives the same amount of light as the average amount when the shutter rotates.

Referring to FIGS. 7 and 8, there is shown a portion of a third motion picture camera which comprises a reciprocating shutter 29. The drive for the shutter 29 includes a disk 30 driven by a shaft 31 and having an eccentric crank pin 32 which extends into an elongated vertical slot 33 provided in a downward extension 29a of the shutter 29. The shutter further comprises two eyes or followers 34, 35 which are slidable along a horizontal guide rod 35 mounted on the wall 104 of the camera housing. The aperture is shown at 105, the objective at 3, and the film at 6. When the shaft 31 is driven by the motor (not shown in FIGS. 7 and 8), the pin 32 causes the shutter 29 to travel back and forth along the guide rod 36 and to respectively cover and uncover the aperture 105. FIG. 8 shows the shutter 29 in the position of rest in which a portion of its blade 39 extends across the space between the objective 3 and aperture 105. The front side of the blade 39 is provided with a light-reflecting surface 37. This surface includes a portion which covers the aperture 105 part of the time when the shutter 29 is in motion and which includes four straight equidistant parallel strip- or band-shaped sections 37a—37d corresponding substantially to the sections 15a—15f. These sections are inclined with reference to the optical axis of the objective 3 to the same extent and are arranged in stepwise fashion (see FIG. 7). Their purpose is to reflect light onto a photosensitive element 38 which can be connected with a moving coil instrument in the same way as shown in FIG. 1 or 5.

That portion of the surface 37 on the blade 39 which is located in front of the aperture 105 when the shutter 29 is at rest comprises straight strip-shaped sections 37a'—37d' alternating with straight strip-shaped sections 37l"—37d". The combined height of the sections 37a' and 37a" equals the height of the section 37a. The same holds true for the sections 37b'—37d', 37b"—37d" and 37b—37d. The sections 37a'—37d' are inclined in the same way as the sections 37a—37d and serve to direct light against the photosensitive element 38. The sections 37a"—37d" reflect light back toward the objective 3 in the same way as the sections 15a"—15f", i.e., the planes of the sections 37a"—37d" are normal to the axis 3a. The ratio of the amounts of light reflected by the sections 37a'—37d' when the shutter 29 is in the position of rest to the average amounts of light reflected by the sections 37a—37d when the shutter reciprocates is selected in such a way that the average amount of light received by the element 38 remains unchanged regardless of whether the shutter is in motion or not. Thus, the needle of the moving coil instrument which is connected in circuit with the element 38 will remain at a standstill, as long as the intensity of scene light is unchanged.

The shutter 7, 22 or 29 preferably consists of a single piece of synthetic plastic material which can be formed by injection molding or in accordance with another suitable plastic processing method. Thus, the shutter can receive its final form during shaping so that its manufacture involves little cost. The one-piece plastic article is then provided with a thin coat of light-reflecting material to form the surface 15, 24 or 37.

It is clear that the improved motion picture camera is susceptible of many additional modifications without departing from the spirit of my invention. For example, the sections of the light-reflecting surface need not resemble strips or bands and need not be distributed with utmost uniformity. The reflecting surface may resemble a checkerboard with small mutually inclined rectangular fields.

Without further analysis, the foregoing will so fully reveal the gist of the present invention that others can, by applying current knowledge, readily adapt it for various applications without omitting features which from the standpoint of prior art fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

I claim:

1. In a motion picture camera, a combination comprising an objective; means defining a light-admitting aperture behind the axis of said objective; photosensitive means; and shutter means moving cyclically between said objective and said aperture for covering and uncovering said aperture during each cycle so that the film is exposed only when said aperture is uncovered, said shutter means having a rest position covering said aperture and being provided with a light-reflecting surface which reflects light received from said objective when said aperture is covered, said surface having a first portion which reflects light onto said photosensitive means when the shutter means is in motion but still covers said aperture and a second portion which, when the shutter means is in said rest position, reflects a first amount of light onto said photosensitive means and reflects a second amount of light in a direction other than toward said photosensitive means.

2. A combination as defined in claim 1, wherein said shutter means comprises a single piece of synthetic plastic material having a side facing said objective and provided with a thin coat of light-reflecting material forming said surface.

3. A combination as defined in claim 1, wherein said surface portions are of arcuate shape.

4. A combination as defined in claim 1, wherein said shutter means is rotatable about a fixed axis and further comprising drive means for said shutter means.

5. A combination as defined in claim 1, wherein said shutter means is reciprocable between said objective and said aperture, and further comprising drive means for reciprocating said shutter means.

6. A combination as defined in claim 1, wherein at least one portion of said surface is stepped.

7. A combination as defined in claim 1, wherein said shutter means comprises a blade and said surface is provided on said blade.

8. A combination as defined in claim 1, wherein said photosensitive means forms part of an automatic diaphragm.

9. A combination as defined in claim 1, wherein said surface is arranged to reflect light upwardly in normal position of the camera.

10. In a motion picture camera, a combination comprising an objective; means defining a light-admitting aperture behind the axis of said objective; photosensitive means; and shutter means moving cyclically between said objective and said aperture for covering and uncovering said aperture during each cycle so that the film is exposed only when said aperture is uncovered, said shutter means having a rest position covering said aperture and being provided with a light-reflecting surface which reflects light received from said objective when said aperture is covered, said surface having a first portion which reflects light onto said photosensitive means when the shutter means is in motion but still covers said aperture and a second portion which, when the shutter means is in said rest position, reflects a first amount of light onto said photosensitive means and reflects a second amount of light in a direction other than toward said photosensitive means, the first portion of said surface comprising sections having a predetermined inclination with reference to said axis and arranged to reflect light onto said photosensitive means and the second portion of said surface having first sections having the same inclination as the sections of said first portion and arranged to reflect said first amount of light and second sections whose inclination is different from said predetermined inclination so that said second sections reflect said second amount of light.

11. A combination as defined in claim 10, wherein said first and second sections are distributed uniformly in the second portion of said surface.

12. A combination as defined in claim 10, wherein said second sections alternate with said first sections.

13. A combination as defined in claim 10, wherein said sections resemble elongated strips.

14. In a motion picture camera, a combination comprising an objective; means defining a light-admitting aperture behind the axis of said objective; photosensitive means; and shutter means moving cyclically between said objective and said aperture for covering and uncovering said aperture during each cycle so that the film is exposed only when said aperture is uncovered, said shutter means having a rest position covering said aperture and being provided with a light-reflecting surface which reflects light received from said objective when said aperture is covered, said surface having a first portion which reflects light onto said photosensitive means when the shutter means is in motion but still covers said aperture and a second portion which, when the shutter means is in said rest position, reflects a first amount of light onto said photosensitive means and reflects a second amount of light in a direction other than toward said photosensitive means, the entire first portion of said surface having a predetermined inclination with reference to said axis and the entire second portion of said surface having a different inclination with reference to said axis.

15. In a motion picture camera with exposure measurement, an objective lens, a picture window, a movable window shutter carrying a mirror arranged between said objective lens and said picture window and facing said objective lens, said mirror being so inclined to the axis of said objective lens that during the dark period of the film it deflects all of the light normally illuminating the picture window to a photoelectric converter to be used as measurement and control light, and a small reflector inclined to the deflecting face of said mirror and disposed on that portion of said mirror which in the still condition of the said shutter is arranged in axial alignment with said objective lens, said small reflector deflecting a part of the exposure light passing through said objective lens past said photoelectric converter, the arrangement being such that the light beam illuminating the picture window during picture taking is deflected in the direction of the movement of said mirror so that shortly before and after said shutter reaches its still position additional light is deflected onto the receiving surface of the photoelectric converter from that portion of the light beam passing through said objective lens which in all other possible mirror positions is not used for measuring the light at the picture window.